United States Patent
Garrard et al.

[11] Patent Number: 5,997,238
[45] Date of Patent: Dec. 7, 1999

[54] ON-LINE PACKAGE STACKING APPARATUS AND METHOD

[75] Inventors: Timothy J. Garrard, Terre Haute, Ind.; James Fuller, Paris, Ill.

[73] Assignees: Sony Corporation, Tokyo, Japan; Sony Electronic, Inc., Park Ridge, N.J.

[21] Appl. No.: 09/170,096

[22] Filed: Oct. 13, 1998

[51] Int. Cl.⁶ ................................................. B65G 57/06
[52] U.S. Cl. .................. 414/789; 198/431; 414/790.7; 414/794.4; 414/802
[58] Field of Search .................. 414/790.7, 789, 414/794.4, 802; 198/347.1, 431

[56] References Cited

U.S. PATENT DOCUMENTS

| | | | |
|---|---|---|---|
| 2,506,550 | 5/1950 | Morrison | 414/790.7 |
| 2,723,606 | 11/1955 | Brockardt, Jr. et al. | 414/794.4 X |
| 2,852,989 | 9/1958 | Chaplin et al. | 414/789 |
| 3,044,772 | 7/1962 | Trenner | 414/794.4 X |
| 3,390,619 | 7/1968 | Williams | 414/794.4 X |
| 3,777,903 | 12/1973 | Kuckhermann | 414/790.7 X |
| 3,880,420 | 4/1975 | Martin | 414/794.4 X |
| 4,610,593 | 9/1986 | Voss et al. | 414/790.7 |
| 5,458,227 | 10/1995 | Wheeler et al. | 198/403 |

Primary Examiner—Janice L. Krizek
Attorney, Agent, or Firm—Ronald P. Kananen; Rader, Fishman & Grauer

[57] ABSTRACT

A product stacking apparatus, and a method of using it, is provided, where the apparatus is located inline with a product conveyor, and includes a frame having at least one spanner connecting plates which together straddle the product conveyor, a drive roller, an infeed system driven by the drive roller, having carriers which move upstream to downstream relative to motion of the product conveyor, a hopper which receives a product from the infeed system, an automatic detainer which automatically opens the hopper so that a predetermined number of the products exits the hopper on the conveyor, an automatic dropgate mechanism, located between the infeed system and the hopper, which automatically releases the product into the hopper, and sensors which count products, allows for their accumulation and release, and prevents jamming of the product on the apparatus.

16 Claims, 2 Drawing Sheets

ON-LINE PACKAGE STACKING APPARATUS AND METHOD

BACKGROUND OF THE INVENTION

Products of all kinds are conveyed on a belt or other drive during processing. When many of the products are similarly or identically shaped, it is common to stack the products prior to packaging, so that many products may be packaged together. Stacking is also needed as a manner of counting identically shaped products, and grouping a certain number of products together before further processing.

In existing product processing procedures, operators are required to accumulate and count products that arrive at the operators' positions, one by one on a product delivery conveyor. Operators were then required to move the desired accumulated quantity to a location where shipping case loading could then be performed. Such a procedure expends valuable man hours and can be very tiring for operators.

It is therefore an object of the present invention to allow for automatic accumulation of products from a conveyor in a desired quantity, and release the accumulated products onto that same conveyor. It is a further object of the present invention to receive and release the products when they are stacked at a certain elevation. It is yet another object of the invention to provide an apparatus that accomplishes the above functions that is easily attached and removed from a conveyor.

SUMMARY OF THE INVENTION

The present invention is directed to a product stacking apparatus located inline with a product conveyor, which includes a frame having at least one spanner connecting plates which together straddle the product conveyor, a motorized drive roller, extending between the plates, an infeed system, driven by the drive roller, having carriers which move upstream to downstream relative to motion of the product conveyor, a hopper, located upstream of said infeed system, which receives a product from said infeed system, and an automatic detainer, which automatically opens the hopper when a predetermined number of the products is received in the hopper, so that the predetermined number of said products exits the hopper on the conveyor.

The product stacking apparatus may further include an automatic dropgate mechanism, located between the infeed system and the hopper, which has a holder that receives the product from the infeed mechanism, and automatically releases the product into the hopper, and a dropgate sensor, located in the vicinity of the dropgate mechanism, which provides a dropgate release signal upon sensing the product on the holder.

The product stacking apparatus may also include an infeed jam sensor, located in the vicinity of the carriers of the infeed system, which provides an infeed jam signal upon sensing a second product on the carriers, and a controller, which produces a pause signal when the infeed jam signal and the dropgate release signal are emitted concurrently, and causes the drive roller to stop driving the infeed system, thereby preventing a product jam.

The carriers may move faster than the product conveyor to ensure that the products will not jam at the interface between the infeed system and the conveyor.

The product stacking apparatus may further include a hopper photo sensor, which produces a product presence signal when the product has entered into the hopper, and a count photo sensor, which produces a count signal when the product is entering into the hopper.

The product stacking apparatus also has a controller, which compiles a count total from the count signal, and produces a release signal when the count total reaches a predetermined value, so that the automatic detainer opens. The count signal may be maintained by the count photo sensor if the predetermined value of the count total is reached and if the product is held at a predetermined elevation in the hopper. The release signal may then be produced only when the count signal is maintained. The controller may also produce a hopper jam signal when the count signal is not followed by the product presence signal.

The above objects and others are also met by a method of stacking products as they are moved along a conveyor, which includes the steps of removing the products from the conveyor using an inline infeed system, driven by a motorized drive roller, which has carriers that move, relative to motion of said conveyor, from upstream to downstream; sequentially receiving the products from the inline infeed system into a hopper provided upstream of the inline infeed system, so that the products are stacked; and automatically opening the hopper when a predetermined number of the products is received in the hopper, whereby the predetermined number of the products exits the hopper on said conveyor.

The method may further include the steps of receiving the products from the inline infeed system into an automatic dropgate mechanism, located between the infeed system and the automatic detainer; holding the product in the automatic dropgate mechanism; providing a dropgate release signal from a dropgate sensor, located in the vicinity of the dropgate mechanism, upon sensing the product on the dropgate mechanism; and automatically releasing the product from the automatic dropgate mechanism into the hopper.

The method may also include the steps of providing an infeed jam signal from an infeed jam sensor, located in the vicinity of the carriers of the infeed system, upon sensing said products on the carriers; and producing a pause signal by a controller when the infeed jam signal and the dropgate release signal are emitted concurrently, causing the drive roller to stop driving the infeed system, thereby preventing a product jam. The carriers may also move at a faster rate than the conveyor to avoid a product jam.

The method may also include the steps of producing a product presence signal, using a hopper photo sensor, when each of the products enters into the hopper; and producing a count signal, using a count photo sensor, when the product is entering into the hopper. The method may also include compiling a count total from the count signal, using a controller; and producing a release signal from the controller when the count total reaches a predetermined value, so that the automatic detainer opens.

The count signal may be maintained by the count photo sensor if the predetermined value of the count total is reached and if the product is held at a predetermined elevation in the hopper. Accordingly, the release signal may be produced only when the count signal is maintained. A hopper jam signal may also be produced by the controller when the count signal is not followed by the product presence signal.

DESCRIPTION OF THE PREFERRED EMBODIMENT

Figure 1:
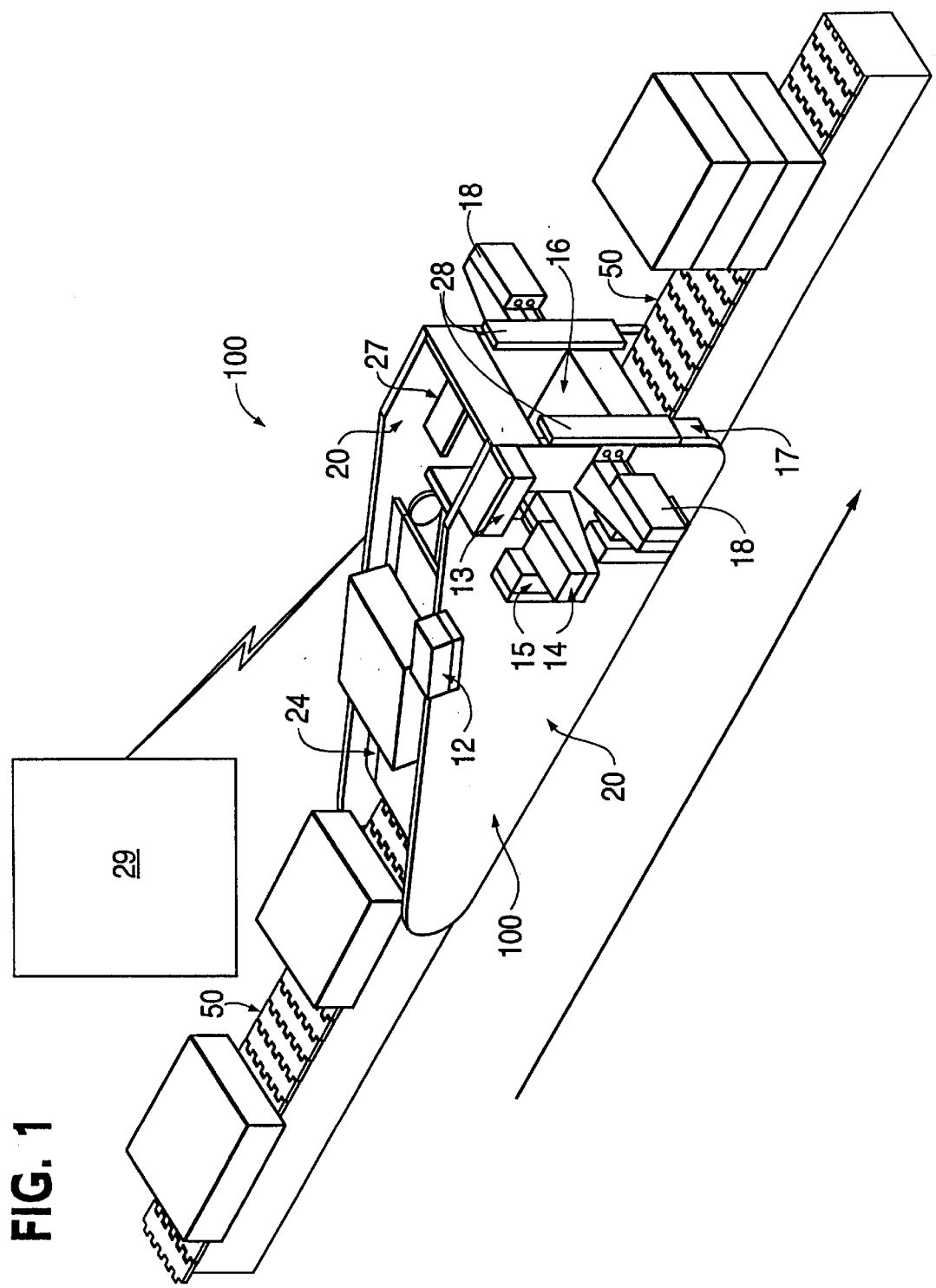
FIG. 1 shows an exterior view of the stacker as operable on a product conveyor.
Figure 2:
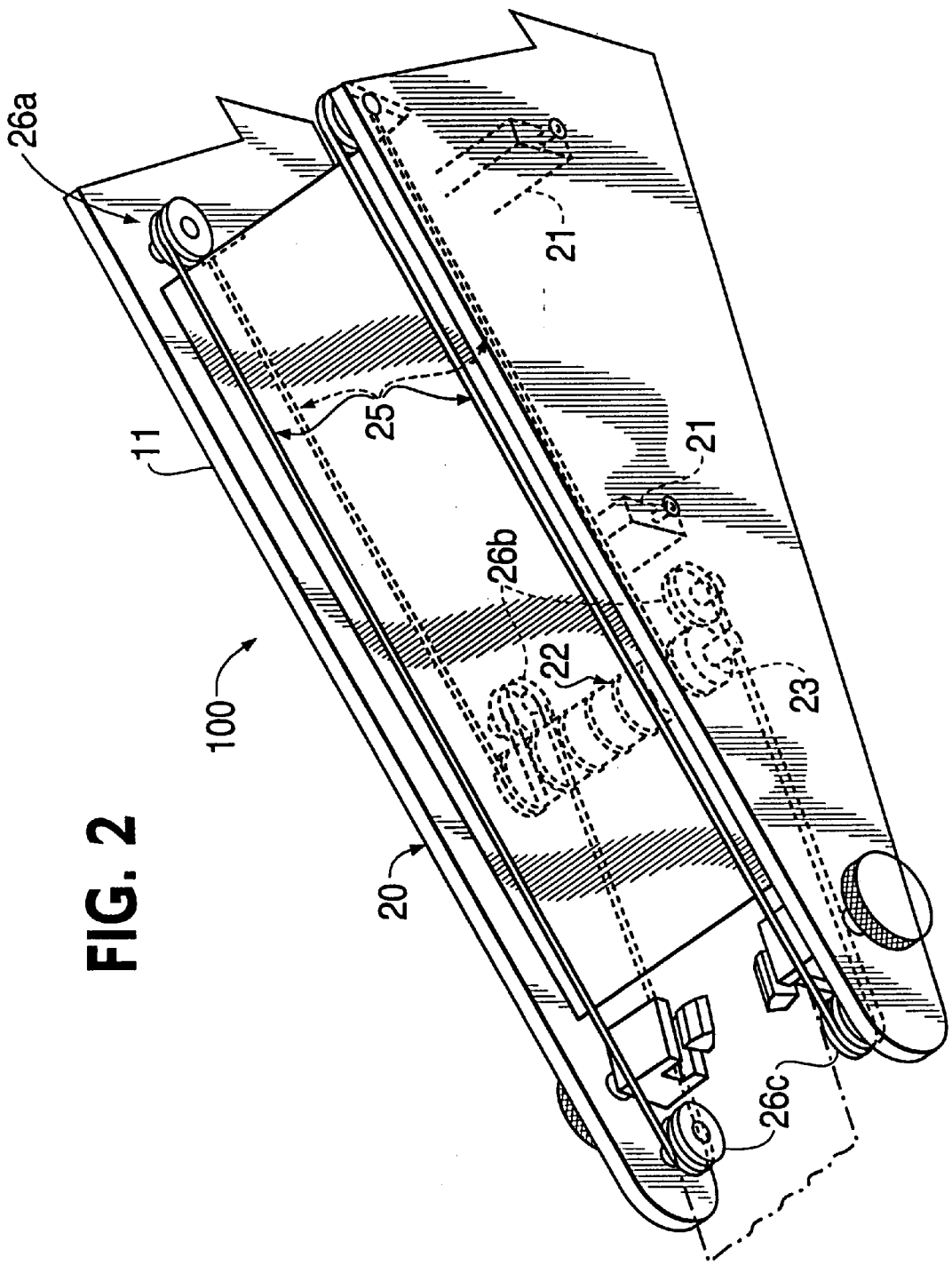
FIG. 2 shows an exterior view of a portion of the stacker and the driving mechanisms.

The above objects and others are met by the on-line product stacking apparatus 100 shown in FIGS. 1 and 2, and its method of use. A stacker frame 10 includes two metal plates 20, preferably aluminum, which are utilized to support the stacking mechanisms described hereinafter. The plates 20 are generally triangular in shape, and are positioned directly opposite each other, with at least one spanner bar 21 which separates the plates 20 at a desired width. The spanner bar 21 may be adjustable in order to allow the plates 20 to accommodate conveyors of various widths. The desired width between the plates 20 is set so that the stacking apparatus 100 may straddle a conveyor 50 onto which the stacking apparatus 100 is placed. When the stacking apparatus 100 is in place, as shown in FIG. 1, the sides of the conveyor 50 may be attached to, and even provide support for, the plates 20.

Referring to FIG. 2, the stacker infeed 11 of the stacking apparatus 100 includes a drive roller 22 which extends between the plates 20. The drive roller 22 rotates by an axle piece 23 and drives a conveying system 24 to move a package along the stacking apparatus 100. The axle piece 23 is pressed into a bearing (not shown) housed between the plates 20, allowing the drive roller 22 and axle piece 23 to rotate, and in turn, to drive the conveying system 24. In a preferred embodiment of the invention, the conveying system 24 includes two parallel, spaced conveyor polycord belts 25. One polycord belt is positioned on each side of the conveyor 50. The polycord belts 25 are driven around a series of idler pulleys 26 which are coupled to and supported by the plates 20, so that the polycord belts 25 do not contact or rub against the plates 20. The idler pulleys 26 are arranged such that upper, conveying portions of the polycord belts 25 move at an incline along an upwardly sloping path.

For example, first coupled idler pulleys 26a may be located above second coupled idler pulleys 26b which are proximate the drive roller 22. The second coupled idler pulleys 26b are, in turn, located above coupled idler pulleys 26c which are located proximate the end of the stacker infeed 11 where the packages are first picked up by the conveyor 50. When the drive roller 22 rotates counter clockwise as shown in FIG. 2, the polycord belts 25 move along at an inclined path from the end of the stacker infeed 11 where products are picked up by the conveyor 50, to an end where the products are discharged from the conveyor 50 and enter a drop gate mechanism 14. The end where products are picked up is preferably located below a top surface of the conveyor 50. The polycord belts 25 may be frictionally driven by the drive roller 22.

In a preferred embodiment of the invention, the polycord belts 25 are powered at a slightly faster speed than the conveyor 50. Because the polycord belts 25 are moving faster than the conveyor 50, the packages remain separate from each other, thus preventing jamming as the products pass through the stacking apparatus 100.

An infeed jam photo sensor 12 may be mounted along the stacker infeed 11, near the end where products are picked up. The photo sensor 12 is responsible for sending a signal to a programmable logic controller 29 (PLC) when a product is present on the stacker infeed 11. The PLC 29 may communicate with the sensors of the invention by signals transmitted using wires. The PLC 29 is located remotely from the stacker 100. The PLC 29 utilizes the signal from the photo sensor 12 to verify that the drop gate mechanism 14 is clear by the time the next product arrives. If the drop gate mechanism 14 is not clear when this photo sensor 12 senses another product, the PLC 29 will stop the drive roller 22 for a brief period of time, to allow the drop gate mechanism 14 to clear. As a result of this drive roller 22 pause, two products are prevented from being present in the drop gate mechanism 14 and jamming the stacker 100.

The drop gate mechanism 14 may consist of two blades 27 (only one blade 27 shown), made of strong material such as stainless steel, that are actuated toward and away from the center of the stacker 100 by pneumatic pressure cylinders. While there may be a single pneumatic source for powering both blades 27, there is one pneumatic cylinder per blade 27 in the preferred embodiment of the invention. The product is deposited from the polycord belts 25 onto the blades 27. A dropgate photo sensor 13 verifies that the product is in place on the blades by sending a signal to the PLC 29. Once positional verification is complete, the drop gate blade pneumatic cylinders receive a signal from the PLC 29 to retract the blades 27. By retracting the blades 27, the product is allowed to fall downward into a hopper 16 for stacking and staging the product.

The dropgate photo sensor 13 is positioned in the area of the dropgate mechanism 14. When the PLC 29 receives a signal from the dropgate photo sensor 13 that a product is present on the blades 27, the PLC 29 uses the signal as an "OK to open" signal for the blades 27. When the dropgate photo sensor 13 is clear, detecting no product on the blades 27, the PLC 29 signals that the pneumatic cylinders cause the blades 27 to close back toward each other, and await arrival of another product. The PLC 29 also compares the signal from the dropgate photo sensor 13 with the signal from the infeed jam photo sensor 12. If both photo sensors 12, 13 are providing signals of the presence of an object, the infeed conveyor motor 22 is paused to prevent product jamming in the dropgate mechanism 13.

A count photo sensor 15 may be mounted on one side of one of the plates 20. The task of the count photo sensor 15 is to monitor the hopper 16, and to signal the PLC 29 of the stacker 100 when a product is dropping into the hopper 16. Upon receiving this signal, the PLC 29 compiles a count total for the number of products in the hopper 16. Once a predetermined stack quantity count is attained, the PLC 29 utilizes the signal from the count photo sensor 15 to verify proper stack quantity elevation.

The hopper 16 is the area where the product is vertically accumulated until the desired stack quantity is achieved. Once the predetermined quantity of product is counted by signals from the count photo sensor 15, the stack height is verified by the product dwell time in front of the same photo sensor 15. If the predetermined stack quantity is reached and the signal from the count photo sensor 15 is maintained, a hopper gate mechanism 18, located at the down stream end of the hopper 16, will open and allow the completed stack of products to exit the stacker 100. The stacks will be driven out of the stacker 100 by the same conveyor 50 that delivered the products to the stacker 100.

The hopper gate mechanism 18 includes two metal blades 28, such as blades made of stainless steel. The blades 28 are actuated toward and away from the center of the stacker 100 by pneumatic means, much like the blades 27 of the drop gate mechanism 14. For instance, there may be a single pneumatic cylinder providing an operable pressure on the blades 28, or one pneumatic cylinder for each of the blades 28.

The blades 28 of the hopper gate mechanism 18 are located at the downstream end of the stacker 100, and may create the downstream boundary of the hopper 16 during the stacking process. These blades 28 maintain product position in the hopper 16 until the predetermined product quantity is compiled. Once the predetermined product stack quantity is achieved, the PLC 29 of the stacker 100 will open the hopper blades 28. Stacked product is then allowed to exit the stacker 100. The hopper blades are then closed by the PLC 29, once the hopper photo sensor 17 is clear.

The hopper photo sensor 17 is mounted on one of the plates 20. The photo sensor is positioned to be able to monitor the bottom of the hopper 16. The purpose of the hopper photo sensor 17, as discussed above, is to verify product presence in the hopper by sending a signal to the controlling PLC 29. If the count photo sensor 15 counts a product passing by its sensing range, and if the hopper photo sensor 17 never detects a product, the stacking system's PLC 29 can determine that a jam has occurred in the hopper filling process. The PLC 29 also utilizes the signal from the hopper photo sensor 17 to monitor the progress of completed product stacks exiting from the hopper 16. Accordingly, when the hopper gate mechanism 18 opens, the PLC 29 utilizes the clear condition of the signal to close the hopper gate mechanism 18.

Having described an embodiment of the invention, it is to be understood that the invention is not limited to any of the precise embodiments described herein. Various changes and modifications could be effected by one skilled in the art without departing from the spirit or scope of the invention as defined in the appended claims.

What is claimed is:

1. A product stacking apparatus, which comprises:
    a frame comprising at least one spanner connecting plates which together straddle a product conveyor that moves products in an upstream to downstream direction, whereby said product stacking apparatus is in line with said product conveyor;
    a drive roller, extending between said plates;
    an infeed system, driven by said drive roller, comprising carriers that move said products in said upstream to downstream direction;
    a hopper, located downstream of said infeed system, which receives a product from said infeed system;
    a hopper photo sensor, which produces a product presence signal when said product has entered into said hopper; and
    an automatic detainer, which automatically opens said hopper when a predetermined number of said products is received in said hopper, whereby said predetermined number of said products exits said hopper on said product conveyor.

2. A product stacking apparatus according to claim 1, which further comprises:
    an automatic dropgate mechanism, located between said infeed system and said hopper, which comprises a holder which receives said product from said infeed mechanism, and automatically releases said product into said hopper; and
    a dropgate sensor, located in the vicinity of said dropgate mechanism, which provides a dropgate release signal upon sensing said product on said holder.

3. A product stacking apparatus according to claim 2, which further comprises:
    an infeed jam sensor, located in the vicinity of said carriers of said infeed system, which provides an infeed jam signal upon sensing a second product on said carriers; and
    a controller, which produces a pause signal when said infeed jam signal and said dropgate release signal are emitted concurrently, said pause signal causing said drive roller to stop driving said infeed system, thereby preventing a jam of said product and said second product.

4. A product stacking apparatus according to claim 2, wherein said carriers move faster than said product conveyor.

5. A product stacking apparatus according to claim 2, which further comprises:
    a count photo sensor, which produces a count signal at a time when said product is entering into said hopper.

6. A product stacking apparatus according to claim 5, which further comprises a controller, which compiles a count total from said count signal, and produces a release signal when said count total reaches a predetermined value, whereby said automatic detainer opens.

7. A product stacking apparatus according to claim 6, wherein said count signal is maintained by said count photo sensor if said predetermined value of said count total is reached and if said product is held at a predetermined elevation in said hopper, and wherein said release signal is produced when said count signal is maintained.

8. A product stacking apparatus according to claim 5, which further comprises a controller, which produces a hopper jam signal when said count signal is not followed by said product presence signal.

9. A method of stacking products as they are moved along a conveyor that moves products in an upstream to downstream direction, which comprises:
    removing said products from said conveyor using an inline infeed system, driven by a drive roller, comprising carriers that move said products in said upstream to downstream direction;
    sequentially receiving said products from said inline infeed system into a hopper provided downstream of said inline infeed system, whereby said products are stacked;
    producing a count signal, using a count photo sensor, at a time when said product is entering into said hopper; and
    automatically opening said hopper when a predetermined number of said products is received in said hopper, whereby said predetermined number of said products exits said hopper on said conveyor.

10. A method of stacking products according to claim 9, which further comprises:
    receiving said products from said inline infeed system into an automatic dropgate mechanism, located between said infeed system and an automatic detainer;
    holding said product in said automatic dropgate mechanism;
    providing a dropgate release signal from a dropgate sensor, located in the vicinity of said dropgate mechanism, upon sensing said product in said dropgate mechanism; and
    automatically releasing said product from said automatic dropgate mechanism into said hopper.

11. A method of stacking products according to claim 10, which further comprises:
    providing an infeed jam signal from an infeed jam sensor, located in the vicinity of said carriers of said infeed system, upon sensing said products on said carriers; and
    producing a pause signal by a controller when said infeed jam signal and said dropgate release signal are emitted concurrently, said pause signal causing said drive roller to stop driving said infeed system, thereby preventing a jamming of said products.

12. A method of stacking products according to claim 9, which further comprises:

moving said carriers at a faster rate than said conveyor.

13. A method of stacking products according to claim 10, which further comprises:

producing a product presence signal, using a hopper photo sensor, when each of said products has entered into said hopper.

14. A method of stacking products according to claim 13, which further comprises:

compiling a count total from said count signal, using a controller; and producing a release signal from said controller when said count total reaches a predetermined value, whereby said automatic detainer opens.

15. A method of stacking products according to claim 14, wherein said count signal is maintained by said count photo sensor if said predetermined value of said count total is reached and if said product is held at a predetermined elevation in said hopper, and wherein said release signal is produced when said count signal is maintained.

16. A method of stacking products according to claim 13, which further comprises:

producing a hopper jam signal, using a controller, when said count signal is not followed by said product presence signal.

* * * * *